(12) United States Patent
Kielwein et al.

(10) Patent No.: US 7,651,136 B2
(45) Date of Patent: Jan. 26, 2010

(54) FORCE LIMITER FOR A VEHICLE SAFETY BELT

(75) Inventors: Thomas Kielwein, Eschach (DE); Martin Roehrle, Mutlangen (DE)

(73) Assignee: TRW Automotive GmbH, Alfdorf (DE)

( * ) Notice: Subject to any disclaimer, the term of this patent is extended or adjusted under 35 U.S.C. 154(b) by 218 days.

(21) Appl. No.: 11/446,688

(22) Filed: Jun. 5, 2006

(65) Prior Publication Data

US 2006/0279076 A1 Dec. 14, 2006

(30) Foreign Application Priority Data

Jun. 10, 2005 (DE) .................. 10 2005 026 885

(51) Int. Cl.
*B60R 22/028* (2006.01)
(52) U.S. Cl. ............... 280/805; 297/470; 242/379.1
(58) Field of Classification Search ........... 280/805; 242/379.1; 297/470
See application file for complete search history.

(56) References Cited

U.S. PATENT DOCUMENTS

| | | | | | |
|---|---|---|---|---|---|
| 2,150,471 | A | * | 3/1939 | Van Vulpen ............... | 285/222.4 |
| 2,956,826 | A | * | 10/1960 | Nord ............................ | 403/368 |
| 4,323,205 | A | * | 4/1982 | Tsuge et al. .............. | 242/379.1 |
| 5,618,006 | A | * | 4/1997 | Sayles ...................... | 242/379.1 |
| 5,779,176 | A | * | 7/1998 | Hori et al. ................. | 242/379.1 |
| 5,779,177 | A | * | 7/1998 | Kielwein .................. | 242/382.6 |
| 5,788,176 | A | * | 8/1998 | Ebner et al. .................. | 242/374 |
| 5,904,371 | A | * | 5/1999 | Koning ........................ | 280/806 |
| 5,913,538 | A | * | 6/1999 | Herpich ...................... | 280/805 |
| 5,934,596 | A | * | 8/1999 | Gorman et al. ........... | 242/379.1 |
| 5,934,597 | A | * | 8/1999 | Ludwig ..................... | 242/379.1 |
| 6,105,893 | A | * | 8/2000 | Schmidt et al. ............. | 242/374 |
| 6,206,316 | B1 | * | 3/2001 | Kielwein et al. .......... | 242/379.1 |
| 6,216,972 | B1 | * | 4/2001 | Rohrle ...................... | 242/379.1 |
| 6,360,980 | B1 | * | 3/2002 | Lee .......................... | 242/379.1 |
| 6,530,536 | B2 | * | 3/2003 | Sumiyashiki et al. ..... | 242/383.2 |
| 6,598,822 | B2 | * | 7/2003 | Nagata et al. ............. | 242/379.1 |
| 6,616,081 | B1 | * | 9/2003 | Clute et al. ............... | 242/379.1 |
| 6,682,009 | B1 | * | 1/2004 | Frank ........................ | 242/379.1 |
| 6,695,243 | B2 | * | 2/2004 | Specht ...................... | 242/379.1 |
| 6,712,305 | B2 | * | 3/2004 | Palliser et al. ............. | 242/379.1 |
| 6,863,234 | B2 | * | 3/2005 | Mishina et al. ........... | 242/379.1 |
| 6,926,221 | B2 | * | 8/2005 | Rohrle et al. ............. | 242/379.1 |
| 6,969,089 | B2 | * | 11/2005 | Klingauf et al. ............. | 280/805 |
| 7,152,824 | B2 | * | 12/2006 | Shiotani et al. ........... | 242/379.1 |
| 7,232,089 | B2 | * | 6/2007 | Inagawa et al. ........... | 242/379.1 |
| 7,370,822 | B2 | * | 5/2008 | Hiramatsu ................ | 242/379.1 |
| 2001/0023904 | A1 | * | 9/2001 | Kanamori et al. ......... | 242/379.1 |
| 2003/0192977 | A1 | * | 10/2003 | Specht ...................... | 242/379.1 |

(Continued)

FOREIGN PATENT DOCUMENTS

| DE | 19732878 | 2/1998 |
|---|---|---|
| DE | 10321729 | 12/2003 |

*Primary Examiner*—Paul N. Dickson
*Assistant Examiner*—Timothy Wilhelm
(74) *Attorney, Agent, or Firm*—Tarolli, Sundheim, Covell & Tummino LLP (57) ABSTRACT

A force limiter for a vehicle safety belt includes a shaft and at least one metal strap, one end of which is attached to the shaft and which supports on a strap accommodation ring radially outside of the shaft. The distance between the strap accommodation ring and the shaft is variable.

29 Claims, 5 Drawing Sheets

U.S. PATENT DOCUMENTS

2003/0222452 A1* 12/2003 Rohrle et al. ............... 280/805
2005/0206152 A1* 9/2005 Delventhal et al. .......... 280/805
2006/0022077 A1* 2/2006 Hiramatsu .................. 242/381
2006/0022078 A1* 2/2006 Kitazawa et al. ............ 242/382
2006/0255583 A1* 11/2006 Lenning ..................... 280/805

* cited by examiner

(PRIOR ART)

FORCE LIMITER FOR A VEHICLE SAFETY BELT

TECHNICAL FIELD

The invention relates to a force limiter for a vehicle safety belt.

BACKGROUND OF THE INVENTION

From DE 103 21 729 A, a force limiter is known that has a shaft and a metal strap, one end of which is attached to the shaft and which supports on a strap accommodation ring radially outside of the shaft. The force limiter serves to limit the force exerted by the safety belt on a vehicle occupant in a restraint case. This is achieved by the shaft of the force limiter being coupled to a belt retractor shaft that is non-rotatably connected to a belt reel. The strap accommodation ring in turn is non-rotatably connected to a housing or a frame of the belt retractor. Thus, the belt reel is secured to the frame via the belt retractor shaft, the shaft of the force limiter, the metal strap, and the strap accommodation ring. If in this state particularly high forces act in the safety belt, such a high torque is effective between the shaft of the force limiter and the strap accommodation ring that the metal strap passed several times around the inner wall of the strap accommodation ring is wound up on the shaft in a direction that is opposite to the direction in which the metal strap was originally incorporated in the strap accommodation ring. In so doing, the metal strap is bent twice, namely at first through approx. 180°, so that the metal strap extends in the opposite direction and is then bent back again somewhat so as to be in snug contact with the curvature of the shaft. This resistance to bending acts as a resistance torque between the strap accommodation ring and the shaft, this resistance torque representing in a known manner a limitation of the force being maximum effective in the safety belt.

In order to obtain with this known design a switchable characteristic curve for the force limitation, two of the energy converter coils described are provided as force limiters. These energy converter coils are connected in parallel in a first restraint phase so that a particularly high belt webbing force is required for achieving a relative rotation between the strap accommodation ring and the shaft of the force limiter. After the first phase one of the energy converter coils may be deactivated, so that then a lower belt webbing force is sufficient to obtain the aforementioned relative rotation. In this manner two levels for the force limitation may be achieved with the known design.

In contrast, the invention provides a force limiter that requires only one single energy converter coil, nonetheless permitting a force limitation that may selectively be changed during a restraint case.

BRIEF SUMMARY OF THE INVENTION

This is achieved in a force limiter for a vehicle safety belt including a shaft and at least one metal strap, one end of which is attached to the shaft and which supports on a strap accommodation ring radially outside of the shaft, the distance between the strap accommodation ring and the shaft being variable. Changing this distance results in the shaping radius of the metal strap being changed, this shaping radius in turn having a large influence on the torque at which the shaft rotates relative to the non-rotatable strap accommodation ring. The following applies in this case: the smaller the shaping radius, the larger the torque. Thus, by varying the distance between the strap accommodation ring and the shaft the force being maximum effective in the safety belt may selectively be influenced during the restraint case.

The change in the distance mentioned between the strap accommodation ring and the shaft is preferably achieved by the diameter of the strap accommodation ring being variable.

In order to attain the change in the distance in the easiest way possible, in particular by widening the strap accommodation ring, the latter is preferably formed of several parts. In particular, the strap accommodation ring may be composed of two parts.

Radially outside of the strap accommodation ring there may be disposed a supporting ring which at first causes the strap accommodation ring to preserve its shape against the line load that acts, with a torque present, through the metal strap layers radially outwards onto the strap accommodation ring.

Advantageously, the strap accommodation ring comprises on its outer surface a plurality of supporting lands, the outer surface extending therebetween in a bow-shaped manner. Thereby, on the one hand the friction between these components is reduced as compared to a contact between the strap accommodation ring and the supporting ring over the entire surface, and on the other hand the flexibility of the strap accommodation ring increases on account of the outer surface extending in a bow-shaped manner between the supporting lands.

According to a preferred embodiment the supporting ring comprises a tapered inner surface and/or the strap accommodation ring comprises a tapered outer surface. This means that the contact surfaces of the strap accommodation ring formed by the supporting lands extend obliquely and thus constitute parts of an (imaginary) tapered shell surface area.

Preferably, the supporting ring is displaceable in the axial direction relative to the strap accommodation ring. Such a displacement of the supporting ring relative to the strap accommodation ring results in connection with a tapered inner surface of the supporting ring or a tapered outer surface of the strap accommodation ring in a change of the diameter of the strap accommodation ring which rests against the supporting ring in a prestressed condition on account of the metal strap, when the supporting ring is axially displaced.

Preferably, the supporting ring is rotatable relative to the strap accommodation ring. The rotation is for example effected by means of a pyrotechnical drive that is ignited, if required, and causes a rotary movement of the supporting ring.

According to a first embodiment there is provided a housing and a sliding guide which converts a rotation of the supporting ring relative to the housing into a displacement of the supporting ring in the axial direction. Thereby, in the design already described, which includes a tapered inner surface of the supporting ring or a tapered outer surface of the strap accommodation ring, a change in the diameter of the strap accommodation ring and thus in the belt webbing force acting on the vehicle occupant may be attained by means of a simple rotation of the supporting ring.

According to a further embodiment the supporting ring comprises an inner surface provided with a plurality of ramps and/or the strap accommodation ring comprises an outer surface provided with a plurality of ramps. Thus, the inner surface of the supporting ring or the outer surface of the strap accommodation ring has a kind of sawtooth profile.

Also in this embodiment the supporting ring is advantageously rotatable relative to the strap accommodation ring. In such a rotation the supporting lands on the outer surface of the strap accommodation ring or the ramps configured thereon follow the ramps disposed on the inner surface of the supporting ring, whereby a change in the diameter of the strap accommodation ring is likewise achieved.

Preferably, there is provided a housing, and the strap accommodation ring is non-rotatable relative to the housing.

It is only due to this fact that the force limitation by means of the metal strap disposed between the strap accommodation ring and the shaft of the force limiter becomes possible.

The strap accommodation ring may be provided with at least one cam which is held in a recess of the housing. The cam and the recess of the housing thus form a locking means against rotation by means of which a non-rotatable fastening of the strap accommodation ring relative to the housing is achieved by simple means, the strap accommodation ring nevertheless being able to move radially relative to the housing for the purpose of varying the diameter.

BRIEF DESCRIPTION OF THE DRAWINGS

FIG. 8a shows a sectional view of the force limiter according to the first embodiment of the invention in a restraint case;

FIG. 8b shows a section along the plane 8-8 of FIG. 8a;

FIG. 8c shows a torque characteristic pertinent to the force limiter of FIGS. 8a and 8b;

FIG. 9a shows a sectional view of the force limiter of FIG. 8a, however after a switching action has taken place;

FIG. 9b shows a section along the plane 9-9 of FIG. 9a;

FIG. 9c shows a torque characteristic pertinent to the force limiter of FIGS. 9a and 9b;

DETAILED DESCRIPTION OF THE PREFERRED EMBODIMENTS

Figure 1:
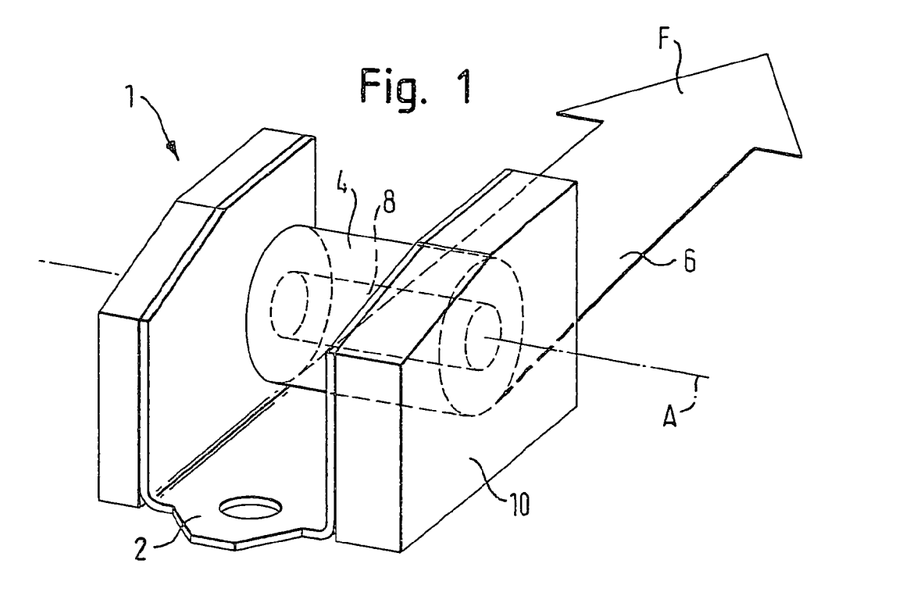
FIG. 1 shows a schematic perspective view of a belt retractor including a force limiter in accordance with the invention.

FIG. 1 shows a belt retractor 1 including a frame 2 in which a belt reel 4 is rotatably mounted. A safety belt 6 is wound up on the belt reel 4. Disposed in the interior of the belt reel 4 is a torsion-resistant shaft 8 whose left-hand end referring to FIG. 1 is non-rotatably connected to the belt reel 4. In order to prevent that belt webbing may uncontrolledly be withdrawn from the belt reel 4 in a restraint case, it is provided to secure in the case of a blocking action the shaft 8 by its right-hand end in FIG. 1 to the frame 2 of the belt retractor 1 via a force limiter 10. The force limiter 10 ensures that with a predetermined belt webbing force, which is indicated in the figure by the arrow F, or a corresponding torque in the axis A of the belt retractor 1 belt webbing is released in a defined manner. In this way the kinetic energy of the vehicle occupant is dissipated in such a manner that an optimum restraint is achieved, whilst at the same time considerably reducing the risk of an injury.

Figure 2:
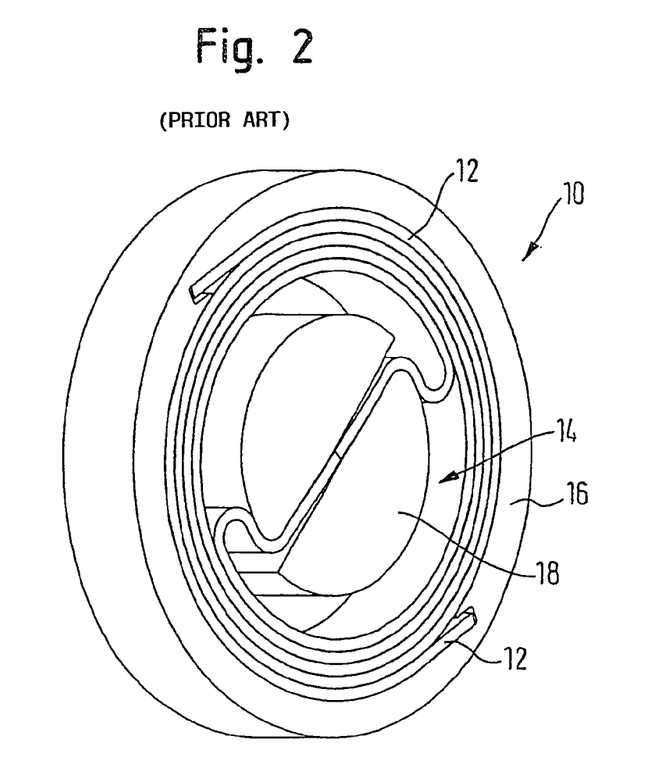
FIG. 2 shows a perspective view of a force limiter according to the prior art.

The force limiter 10 is a so-called energy converter coil whose basic structure is known from the prior art and represented in FIG. 2. The force limiter 10 comprises in this arrangement two metal straps 12 which are disposed in a drum-shaped accommodation space 14 in the interior of a strap accommodation ring 16. Both metal straps extend from their outer end in FIG. 2, which is attached to the strap accommodation ring 16, clockwise along the cylindrical wall of the accommodation space 14. In so doing, both metal straps 12 are guided around a shaft 18 through somewhat more than two turns and are then connected to the shaft 18 against their winding direction. Thus, in the package of metal straps 12 extending along the wall of the accommodation space 14 the two individual straps alternately follow each other. It is possible as well to use only one or more than two metal straps.

In a restraint case the shaft 18 is coupled to the shaft 8 of the belt retractor 1, whilst the strap accommodation ring 16 is non-rotatably connected to the frame 2 of the belt retractor 1.

Figure 3:
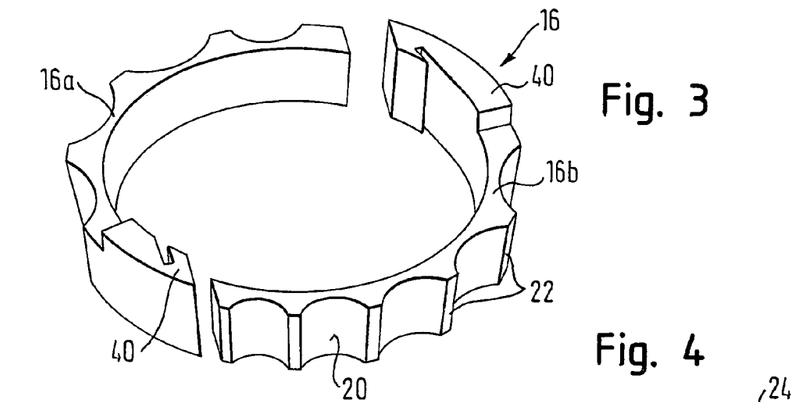
FIG. 3 shows a perspective view of a strap accommodation ring according to a first embodiment of the invention.

The force limiter 10 in accordance with the invention differs from that according to the prior art first of all by the strap accommodation ring 16 being configured in several parts, in particular in two parts (see in particular FIG. 3). Both parts 16a, 16b of the strap accommodation ring 16 comprise on their outer surface 20 a plurality of supporting lands 22, the outer surface 20 extending in a bow-shaped manner therebetween. Moreover, the outer surface 20 of the strap accommodation ring 16 and, together with the latter also the outwardly pointing surfaces of the supporting lands 22, are configured in a tapered manner. Disposed radially outside of the strap accommodation ring 16 is a supporting ring 24 whose inner surface 26 likewise extends in a tapered manner, but complementarily with respect to the outer surface 20 of the strap accommodation ring 16 so that the latter and the supporting ring 24 rest against one another on their entire width (cf. FIG. 8b). It should be noted that in FIGS. 8 and 9 the representation of the bow-shaped outer surface 20 and of the supporting lands 22 was omitted for simplification purposes.

Figure 4:
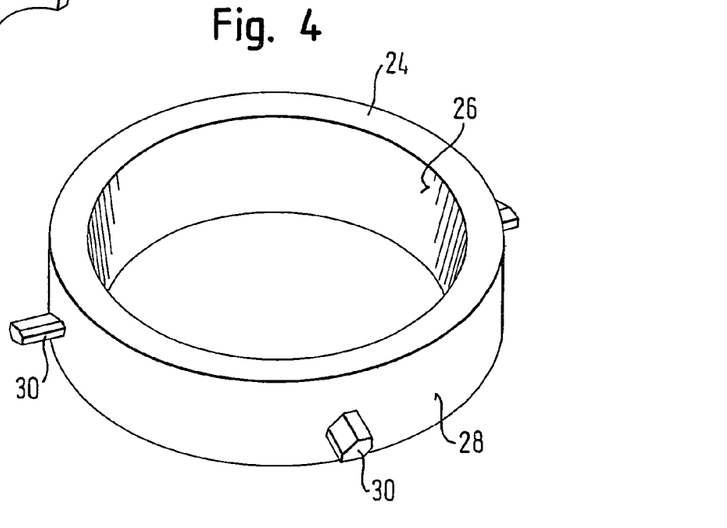
FIG. 4 shows a perspective view of a supporting ring according to a first embodiment of the invention.
Figure 5:
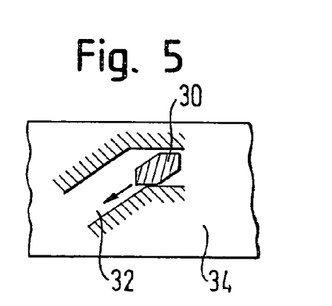
FIG. 5 shows a detailed view of a housing including a sliding guide according to a first embodiment of the invention.

The supporting ring 24 comprises on its outer surface 28 a plurality of control elements 30 (see in this respect also FIGS. 4 and 5), these control elements 30 engaging in corresponding guiding grooves 32 of a housing 34 radially surrounding the supporting ring 24 on the outside. The housing 34 may, for example, be a housing of the belt retractor 1 connected to the frame 2. Of course, the sliding guide formed by the control elements 30 and the guiding grooves 32 may also be implemented exactly vice versa, namely in such a manner that the control elements are provided on the housing 34 and the guiding grooves are provided on the supporting ring 24. As is apparent in FIG. 5, the guiding grooves 32 extend under an acute angle with respect to the plane of the supporting ring 24.

The housing 34 is closed by a cap 36 which comprises two recesses 38 lying diametrically opposite to one another, only one of which is represented in FIG. 8b. Held in each recess 38 is a cam 40 integrally formed with the strap accommodation ring 16 or with each of the two parts 16a, 16b (see also FIG. 6).

Figure 6:
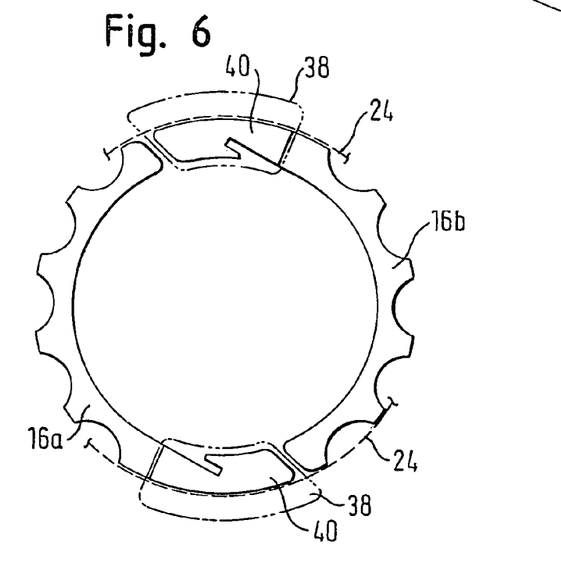
FIG. 6 shows a schematic top view onto a force limiter according to a first embodiment of the invention.
Figure 7:
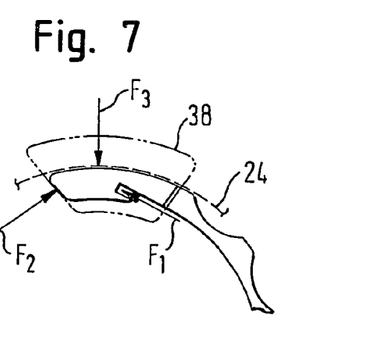
FIG. 7 shows an enlarged detail from FIG. 6.
Figure 8:
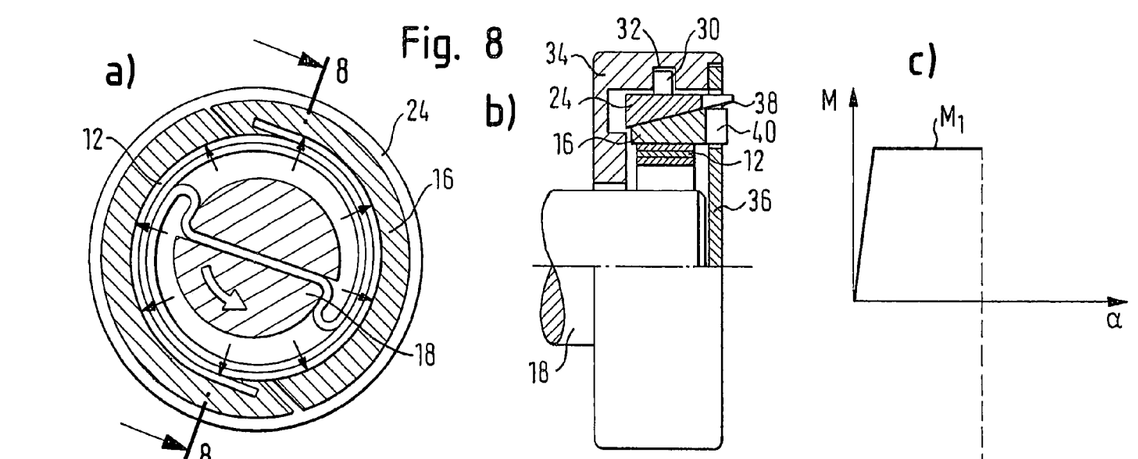
Figure 9:
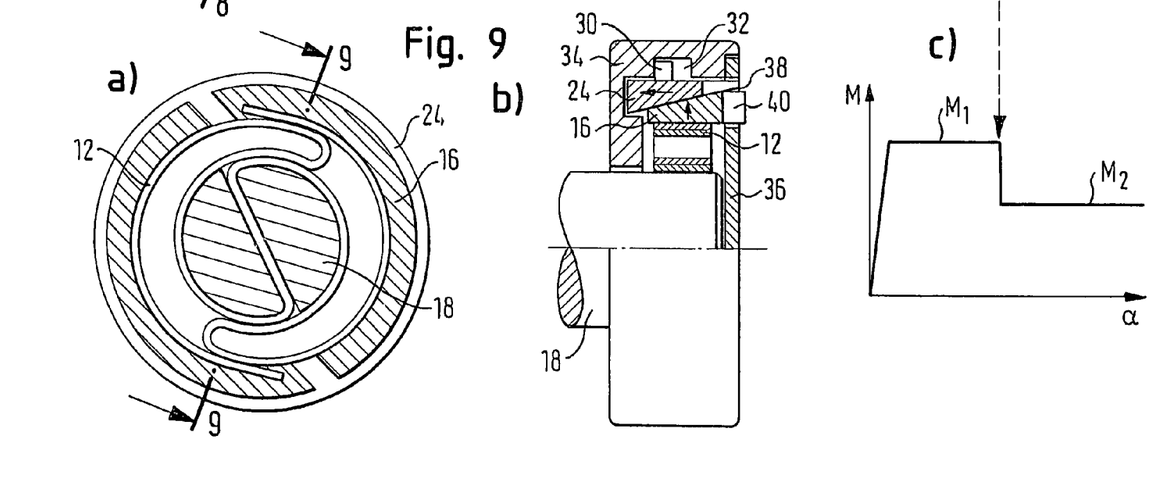

As already mentioned before, the shaft 18 is coupled to the shaft 8 of the belt retractor 1 in a restraint case. Thereby, the belt reel 4 is basically non-rotatably blocked, since a torque exerted thereon by the safety belt 6 is supported via the shaft 8, the shaft 18, and the metal straps 12 of the force limiter 10 on the strap accommodation ring 16, and thereby on the housing 34 that is connected to the frame 2. The strap accommodation ring 16 is non-rotatably held relative to the housing 34, since the cam 40 of the strap accommodation ring 16 constitutes, together with the recess 38 of the housing, a locking means against rotation (FIG. 6). FIG. 7 shows how the force acting on the metal strap 12 is transmitted via the cam 40 to the recess 38 and the supporting ring 24, respectively. The arrow $F_1$ represents here the webbing force, and the arrows $F_2$ and $F_3$ represent the counter forces exerted by the recess 38 and the supporting ring 24, respectively.

As soon as the force acting in the safety belt 6 has exceeded a predetermined threshold, the torque that is effective in the shaft 8 of the belt retractor 1 is larger than the resistance torque that is made available by the force limiter 10. The shaft 18 (and, together therewith, the shaft 8) then rotates anticlockwise in the direction of the arrow referring to FIG. 8a, the metal straps 12 being unwound from the outer stack and wound up on the shaft 18 in the opposite direction. The resistance torque generated in the process is largely determined by the shaping radius of the metal straps 12 which are bent twice at the respective bending point. In the first phase shown in FIG. 8, the shaping radius is comparatively small owing to the relatively small distance between the strap accommodation ring 16 and the shaft 18, the pertinent resistance torque $M_1$ (see FIG. 8c, with a designating the angle of rotation of the shaft 18) therefore being correspondingly high. Apart from the distance between the strap accommodation ring 16 and the shaft 18, the geometric design of the shaft 18 and the thickness of the metal strap 12 influence the shaping radius as well.

In order to reduce the resistance torque generated by the force limiter 10 during an accident situation, the supporting ring 24 is rotated relative to the housing 34 (and thus also relative to the strap accommodation ring 16 which, as mentioned before, is non-rotatably held relative to the housing 34) by means of a rotating means not shown. The rotating means may comprise a pyrotechnical unit and/or may be operated in response to the rotational length traveled by the belt reel. The rotation of the supporting ring 24 is converted into a displacement of the same in the axial direction by means of the sliding guide formed by the control elements 30 and the guiding grooves 32.

On account of the tapered inner surface 26 of the supporting ring 24, against which the likewise tapered supporting lands 22 of the strap accommodation ring 16 rest, the latter is moved radially outwards owing to the line load acting thereon radially outwards (illustrated by the arrows in FIG. 8a), since the supporting ring 24 now permits this movement. In so doing, the diameter of the strap accommodation ring 16 increases, which is possible because, on the one hand, the strap accommodation ring is configured in two parts, and, on the other hand, it is resiliently designed in the annular plane, the strap accommodation ring therefore adapting to the change in the position of the supporting ring 24. In this arrangement the special design of the strap accommodation ring 16 including the supporting lands 22 contributes to an optimum adaptation to the supporting ring 24. Moreover, the flexibility of the strap accommodation ring 16 increases on account of the outer surface 20 extending in a bow-shaped manner between the supporting lands 22. By means of this widening of the strap accommodation ring 16, which is directed radially outwards, the distance between the strap accommodation ring 16 and the shaft 18 increases, thereby also increasing the shaping radius of the metal straps 12 which, of course, adapt to the enlarged diameter of the strap accommodation ring 16. By means of this switching action initiated by the rotation of the supporting ring 24 the resistance torque of the force limiter 10 is lowered to the value $M_2$ (see FIG. 9c).

Figure 10:
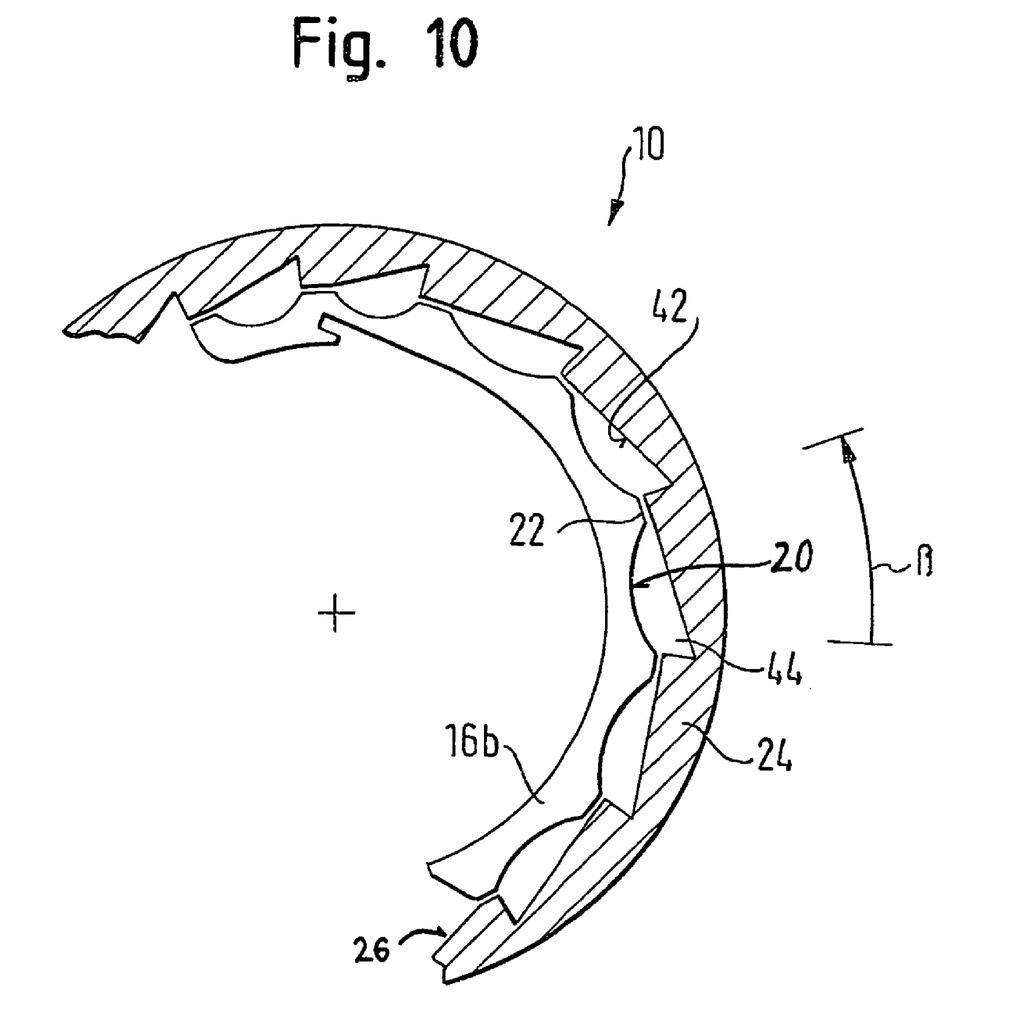
FIG. 10 shows a schematic view of a force limiter according to a second embodiment of the invention.

FIG. 10 shows a part of a force limiter 10 according to a second embodiment of the invention. The same components are provided here with the same reference numerals, and hereinafter only the differences to the first embodiment shall be explained. Also the strap accommodation ring 16 according to the second embodiment of the force limiter 10 is configured in two parts and comprises a plurality of supporting lands 22 which contact the inner surface of the supporting ring 24. In contrast to the first embodiment, however, the inner surface 26 of the supporting ring 24 and the outer surface 20 of the strap accommodation ring 16 (or of the supporting lands 22) are not tapered in the axial direction, but configured cylindrically. The inner surface 26 of the supporting ring 24 comprises a plurality of ramps 42 whose number corresponds to that of the supporting lands 22. Of course, as an alternative to the design shown, also the strap accommodation ring 16 may comprise the ramps 42, the supporting ring 24 being then provided with corresponding supporting lands.

If now the supporting ring 24, as already described, is rotated anticlockwise through the angle β, the supporting lands 22 which, in a first phase of the restraint case, are in the position shown in FIG. 10, will slide along the ramps 42. Thereby, depending on the size of the angle of rotation β the supporting lands 22 immerse to different extents in the gaps 44 of the ramps 42, whereby the strap accommodation ring 16 is widened and the resistance torque generated by the force limiter 10 is reduced. In contrast to the first embodiment, no axial stroke is generated when the supporting ring 24 is rotated.

Figure 11:
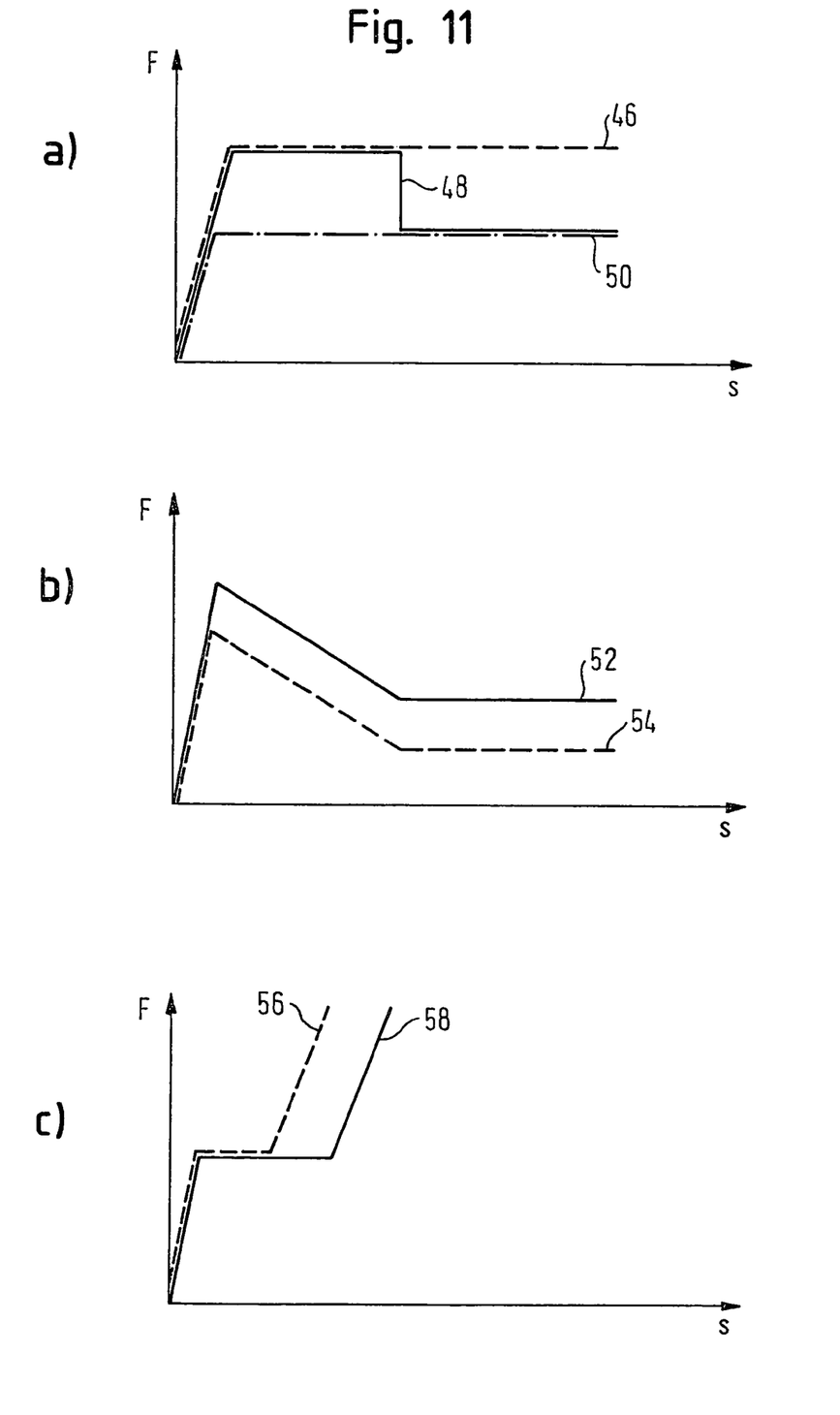
FIGS. 11a to 11c show characteristic curves of different force-path profiles that may be achieved with the force limiter in accordance with the invention.

By means of both force limiters 10 described the characteristic of the force-path profile with a controlled withdrawal of the belt webbing in the restraint case may variably be configured by controlledly changing the rotational speed of the supporting ring 24. Examples of different profiles are shown in FIG. 11. F designates here the belt webbing force, s denotes the length of the belt webbing withdrawn. Represented in FIG. 11a are switching situations that generate one or two constant levels. The line 46 shows the profile of the belt webbing force should the force limiter 10 not be switched at all. The curve 48 illustrates the profile upon switching during the first high force level. The curve 50 shows a force profile that is reached by switching already at an early point in time, before the high level is reached. This may, for example, already be done under the control of a sensor prior to a possible accident.

FIG. 11b represents a force limiter switching action having a decreasing characteristic. Depending on whether the switching action occurs at an early point in time or rather later, a characteristic curve 52 having a high force level or a characteristic curve 54 having a low force level may be attained in this arrangement. In both cases the diameter of the strap accommodation ring 16 is gradually enlarged by slowly rotating the supporting ring 24.

FIG. 11c shows force-path characteristic curves having a progressive characteristic, the switching action being carried out in one case earlier, in one case later during the constant level (curves 56 and 58, respectively). Both characteristic curves have in common that the force F increases as the length s increases, which may be attained by a force limiter with which the distance between the strap accommodation ring 16 and the shaft 18 is reduced during the restraint case.

The invention claimed is:

1. A force limiter for a vehicle safety belt (6), including a shaft (18) and at least one metal strap (12), one end of which is attached to the shaft (18) and which supports on a strap accommodation ring (16) radially outside of the shaft (18), the at least one metal strap (12) being stacked against a radially inner surface of the strap accommodation ring (16), the distance between the strap accommodation ring (16) and the shaft (18) being variable, the diameter of the strap accommodation ring (16) being variable.

2. The force limiter according to claim 1, wherein the strap accommodation ring (16) is formed of several parts.

3. The force limiter according to claim 1, wherein a supporting ring (24) is disposed radially outside of the strap accommodation ring (16).

4. The force limiter according to claim 1, wherein the strap accommodation ring (16) comprises on its outer surface (20) a plurality of supporting lands (22), the outer surface (20) extending therebetween in a bow-shaped manner.

5. The force limiter according to claim 3, wherein the supporting ring (24) comprises a tapered inner surface (26).

6. The force limiter according to claim 1, wherein the strap accommodation ring (16) comprises a tapered outer surface (20).

7. The force limiter according to claim 3, wherein the supporting ring (24) moves in the axial direction relative to the strap accommodation ring (16) when a force acting on the vehicle safety belt exceeds a predetermined threshold.

8. The force limiter according to claim 3, wherein the supporting ring (24) is rotatable relative to the strap accommodation ring (16).

9. The force limiter according to claim 3, wherein there is provided a housing (34) and a sliding guide, the latter converting a rotation of the supporting ring (24) relative to the housing (34) into a displacement of the supporting ring (24) in the axial direction.

10. The force limiter according to claim 3, wherein the supporting ring (24) comprises an inner surface (26) provided with a plurality of ramps (42).

11. The force, limiter according to claim 10, wherein the supporting ring (24) is rotatable relative to the strap accommodation ring (16).

12. The force limiter according to claim 1, wherein there is provided a housing (34), and wherein the strap accommodation ring (16) is non-rotatable relative to the housing (34).

13. A force limiter for a vehicle safety belt (6), including a shaft (18) and at least one metal strap (12), one end of which is attached to the shaft (18) and which supports on a strap accommodation ring (16) radially outside of the shaft (18), the strap accommodation ring (16) having an outer surface (20) provided with a plurality of ramps (42), the distance between the strap accommodation ring (16) and the shaft (18) being variable.

14. A force limiter for a vehicle safety belt (6), including a shaft (18) and at least one metal strap (12), one end of which is attached to the shaft (18) and which supports on a strap accommodation ring (16) radially outside of the shaft (18), the strap accommodation ring (16) being non-rotatable relative to a housing (34) and being provided with at least one cam (40) which is held in a recess (38) of the housing (34), the distance between the strap accommodation ring (16) and the shaft (18) being variable.

15. A force limiter for a vehicle safety belt (6) comprising:
a shaft (18);
a strap accommodation ring (16) positioned radially outside of the shaft (18); and
at least one metal strap (12) having a first end rotating with the shaft (18) and a second end attached to the strap accommodation ring (16), the radial distance between the strap accommodation ring (16) and the shaft (18) varying upon relative rotation between the shaft (18) and the strap accommodation ring (16).

16. The force limiter according to claim 15, wherein the first end of the at least one metal strap (12) is secured to the shaft (18).

17. The force limiter according to claim 15, wherein the strap accommodation ring (16) moves radially outward from the shaft, (18) to increase the radial distance between the strap accommodation ring (16) and the shaft (18).

18. The force limiter according to claim 15 further comprising a supporting ring (24) radially outside of the strap accommodation ring (16), the strap accommodation ring (16) engaging the supporting ring (24).

19. The force limiter according to claim 15, wherein the diameter of the strap accommodation ring (16) varies upon relative rotation between the shaft (18) and the strap accommodation ring (16).

20. The force limiter according to claim 15, wherein the strap accommodation ring (16) is formed of several parts.

21. The force limiter according to claim 15, wherein a supporting ring (24) is disposed radially outside of the strap accommodation ring (16).

22. The force limiter according to claim 18, wherein the strap accommodation ring (16) includes on its outer surface (20) a plurality of supporting lands (22), the outer surface (20) extending therebetween in a bow-shaped manner.

23. The force limiter according to claim 21, wherein the supporting ring (24) includes a tapered radially inner surface (26).

24. The force limiter according to claim 15, wherein the strap accommodation ring (16) includes a tapered radially outer surface (20).

25. The force limiter according to claim 21, wherein the supporting ring (24) moves in an axial direction relative to the strap accommodation ring (16) upon relative rotation between the shaft (18) and the strap accommodation ring (16).

26. The force limiter according to claim 21, wherein the supporting ring (24) is rotatable relative to the strap accommodation ring (16).

27. The force limiter according to claim 21, wherein a sliding guide converts a rotation of the supporting ring (24) relative to the housing (34) into a displacement of the supporting ring (24) in the axial direction.

28. The force limiter according to claim 21, wherein the supporting ring (24) includes a radially inner surface (26) with a plurality of ramps (42).

29. The force limiter according to claim 28, wherein the supporting ring (24) is rotatable relative to the strap accommodation ring (16).

* * * * *

UNITED STATES PATENT AND TRADEMARK OFFICE
CERTIFICATE OF CORRECTION

| | | |
|---|---|---|
| PATENT NO. | : 7,651,136 B2 | Page 1 of 1 |
| APPLICATION NO. | : 11/446688 | |
| DATED | : January 26, 2010 | |
| INVENTOR(S) | : Kielwein et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this

Twenty-third Day of November, 2010

David J. Kappos
*Director of the United States Patent and Trademark Office*